(12) United States Patent
Takeda et al.

(10) Patent No.: US 11,930,502 B2
(45) Date of Patent: Mar. 12, 2024

(54) TERMINAL AND RADIO COMMUNICATION METHOD FOR CHANGING A FREQUENCY BANDWIDTH

(71) Applicant: NTT DOCOMO, INC., Tokyo (JP)

(72) Inventors: Kazuki Takeda, Tokyo (JP); Kazuaki Takeda, Tokyo (JP); Satoshi Nagata, Tokyo (JP); Qin Mu, Beijing (CN); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 97 days.

(21) Appl. No.: 17/189,805

(22) Filed: Mar. 2, 2021

(65) Prior Publication Data

US 2021/0185650 A1 Jun. 17, 2021

Related U.S. Application Data

(63) Continuation of application No. 16/346,380, filed as application No. PCT/JP2017/039287 on Oct. 31, 2017, now abandoned.

(30) Foreign Application Priority Data

Nov. 1, 2016 (JP) .................................. 2016-214698

(51) Int. Cl.
*H04W 72/12* (2023.01)
*H04L 5/00* (2006.01)
*H04W 72/0453* (2023.01)
*H04W 72/23* (2023.01)

(52) U.S. Cl.
CPC ............. *H04W 72/23* (2023.01); *H04L 5/001* (2013.01); *H04L 5/0053* (2013.01); *H04W 72/0453* (2013.01)

(58) Field of Classification Search
None
See application file for complete search history.

(56) References Cited

U.S. PATENT DOCUMENTS

| 8,843,168 | B2 | 9/2014 | Wang | |
|---|---|---|---|---|
| 2011/0170496 | A1* | 7/2011 | Fong | ................ H04W 52/24 370/329 |
| 2011/0249633 | A1 | 10/2011 | Hong et al. | |
| 2011/0269492 | A1* | 11/2011 | Wang | .................. H04L 5/0064 455/509 |

(Continued)

FOREIGN PATENT DOCUMENTS

| EP | 3518579 A1 | 7/2019 |
|---|---|---|
| JP | 2013513341 A | 4/2013 |

OTHER PUBLICATIONS

Office Action in counterpart European Patent Application No. 17866644.2 dated Jun. 21, 2021 (7 pages).
LG Electronics; "Discussion on support of CA operation in NR"; 3GPP TSG RAN WG1 Meeting #86bis, R1-1609278; Lisbon, Portugal; Oct. 10-14, 2016 (3 pages).
1 Office Action issued in counterpart Japanese Application No. 2018-549011 dated Nov. 2, 2021 (6 pages).

(Continued)

*Primary Examiner* — Sai Aung
(74) *Attorney, Agent, or Firm* — Osha Bergman Watanabe & Burton LLP

(57) ABSTRACT

A terminal is disclosed including a receiver that monitors downlink control channel candidates in a predetermined frequency bandwidth out of a plurality of frequency bandwidths; and a processor that performs a control to change the predetermined frequency bandwidth in accordance with a predetermined timer. In another aspect, a radio communication method is also disclosed.

4 Claims, 12 Drawing Sheets

(56) References Cited

U.S. PATENT DOCUMENTS

| | | | |
|---|---|---|---|
| 2011/0292915 A1 | 12/2011 | Prakash et al. | |
| 2011/0312328 A1 | 12/2011 | Choi et al. | |
| 2012/0230272 A1 | 9/2012 | Kim et al. | |
| 2012/0236814 A1* | 9/2012 | Nishio | H04L 5/0092 370/329 |
| 2013/0083753 A1* | 4/2013 | Lee | H04L 1/1858 370/329 |
| 2013/0094456 A1 | 4/2013 | Ng | |
| 2013/0136095 A1* | 5/2013 | Nishio | H04L 5/14 370/329 |
| 2013/0301608 A1 | 11/2013 | Frenne et al. | |
| 2014/0233537 A1* | 8/2014 | Wu | H04L 5/0091 370/336 |
| 2014/0254452 A1* | 9/2014 | Golitschek Edler Von Elbwart | H04W 52/0219 370/311 |
| 2015/0016370 A1* | 1/2015 | Takeda | H04L 5/0023 370/329 |
| 2015/0043476 A1* | 2/2015 | Takeda | H04L 5/0051 370/329 |
| 2015/0245322 A1* | 8/2015 | Shimezawa | H04L 5/005 370/329 |
| 2015/0327284 A1* | 11/2015 | Wakabayashi | H04L 1/0026 370/252 |
| 2016/0037543 A1* | 2/2016 | Papasakellariou | H04W 88/02 370/329 |
| 2020/0029307 A1 | 1/2020 | Takeda et al. | |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TSG-RAN2 Meeting #95bis; R2-166193 "Carrier Aggregation in NR" Huawei, HiSilicon; Kaohsiung; Oct. 10-14, 2016 (5 pages).

Extended European Search Report issued in European Application No. 17866644.2, dated Apr. 28, 2020 (9 pages).

InterDigital Communications; "DL control channel framework for NR"; 3GPP TSG-RAN WG1 #86bis R1-1610089; Lisbon, Portugal, Oct. 10-14, 2016 (5 pages).

International Search Report issued for PCT/JP2017/039287, dated Jan. 23, 2018 (5 pages).

Qualcomm Incorporated; "Evaluation of Frame Structure Design for UE Power"; 3GPP TSG-RAN WG1 #86bis R1-1610135; Oct. 10-14, 2016, Lisbon, Portugal (7 pages).

Written Opinion issued for PCT/JP2017/039287, dated Jan. 23, 2018 (4 pages).

Office Action issued in counterpart Korean Application No. 10-2019-7013209 dated Mar. 4, 2022 (7 pages).

Office Action issued in Indian Application No. 201917017262; Dated Dec. 8, 2021 (8 pages).

Office Action issued in Chinese Application No. 201780080473.9 dated Oct. 27, 2022 (13 pages).

* cited by examiner

TERMINAL AND RADIO COMMUNICATION METHOD FOR CHANGING A FREQUENCY BANDWIDTH

CROSS-REFERENCE TO RELATED APPLICATIONS

This application is a continuation application of U.S. patent application Ser. No. 16/346,380, filed on Apr. 30, 2019, which is a national phase application of PCT/JP2017/039287, filed on Oct. 31, 2017, which claims priority to Japanese Patent Application No. 2016-214698, filed on Nov. 1, 2016. The entire contents of these applications are hereby incorporated by reference in their entirety.

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE (also referred to as LTE Rel.8 or 9), LTE-A (LTE-Advanced, also referred to as LTE Rel.10, 11 or 12) has been specified, and successor systems (e.g., also referred to as FRA (Future Radio Access), 5G (5th generation mobile communication system), 5G+ (plus), NR (New Radio), NX (New radio access), New RAT (Radio Access Technology), FX (Future generation radio access), LTE Rel.13, 14 or 15 onward, etc.) to LTE have also been studied.

In LTE Rel.10/11, in order to widen the band, introduced is Carrier Aggregation (CA) for aggregating a plurality of component carriers (CC: Component Carrier). Each CC is configured with a system band of LTE Rel.8 as one unit. Further, in CA, a plurality of CCs of the same radio base station (called eNB (eNodeB), Base Station (BS), etc.) is configured for a user terminal (UE: User Equipment).

On the other hand, in LTE Rel.12, Dual Connectivity (DC) is also introduced where a plurality of cell groups (CG: Cell Group) of different radio base stations is configured for a UE. Each cell group is comprised of at least a single cell (CC). In DC, since a plurality of CCs of different radio base stations is aggregated, DC is also called inter-base station CA (Inter-eNB CA) and the like.

Further, in the existing LTE system (LTE Rel. 8-12), introduced is Frequency Division Duplex (FDD) for performing downlink (DL) transmission and uplink (UL) transmission in different frequency bands, and Time Division Duplex (TDD) for switching between downlink transmission and uplink transmission temporally in the same frequency band to perform.

Furthermore, in the existing LTE system, retransmission control of data is used based on HARQ (Hybrid Automatic Repeat reQuest). The UE and/or the base station receives receipt confirmation information (also referred to as HARQ-ACK, ACK/NACK, etc.) on transmitted data, and based on the information, determines retransmission of the data.

CITATION LIST

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (e.g., 5G, NR), it is expected to actualize various radio communication services so as to meet respective different requirements (e.g., ultra-high speed, high capacity, ultra-low delay, etc.). For example, in 5G/NR, it is studied to offer radio communication services called eMBB (enhanced Mobile Broad Band), IoT (Internet of Things), mMTC (massive Machine Type Communication), M2M (Machine to Machine), URLLC (Ultra Reliable and Low Latency Communications) and the like.

Further, in 5G/NR, it is required to support flexible use of numerology and frequency to actualize dynamic frame configurations. For example, the numerology refers to a communication parameter (e.g., subcarrier spacing, bandwidth, etc.) applied to transmission and reception of some signal.

However, it has not been determined yet how to control transmission and reception of communication in the case of using numerology different from that of the existing LTE system or a plurality of types of numerology. It is considered using the control schemes of the existing LTE system without any modification. However, in such a case, there is the risk that transmission and reception (e.g., transmission and/or reception of a downlink control channel and the like) of a signal is not performed properly, and that there are occurrences of problems of decreases in throughput and/or increases in power consumption and the like.

The present invention was made in view of such a respect, and it is an object of the invention to provide a user terminal and radio communication method capable of properly performing communication, also in the case of using numerology different from that of the existing LTE system.

Solution to Problem

A user terminal according to one aspect of the present invention is a user terminal for changing a frequency bandwidth used in transmission and/or reception of a signal to control communication, and is characterized by having a receiving section that receives first downlink control information transmitted in a first frequency bandwidth, and second downlink control information and/or downlink data transmitted in a second frequency bandwidth having a bandwidth of the first frequency bandwidth or more, and a control section that controls reception of the downlink control information and/or the downlink data transmitted in the second frequency bandwidth, based on the first downlink control information.

Advantageous Effects of the Invention

According to the present invention, also in the case of using numerology different from that of the existing LTE system, it is possible to properly perform communication.

DESCRIPTION OF EMBODIMENTS

Figure 1B:
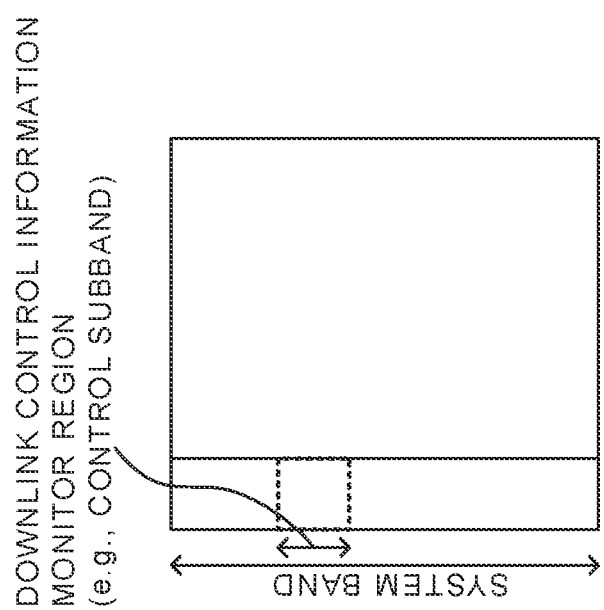
FIGS. 1A and 1B are diagrams to explain frequency bands to monitor downlink control channels.

In the existing LTE system, a base station transmits downlink control information (DCI) to a UE, using a downlink control channel (e.g., PDCCH (Physical Downlink Control Channel), Enhanced PDCCH (EPDCCH), etc.). Transmitting the downlink control information may be read with transmitting a downlink control channel.

The DCI may be scheduling information including at least one of information on time frequency resources and transport block for scheduling data, data modulation scheme information, HARQ retransmission information, information on RS for demodulation and the like. DCI for scheduling DL data reception and/or measurement of a DL reference signal may be called DL assignment or DL grant, and DCI for scheduling UL data transmission and/or transmission of a UL sounding (for measurement) signal may be called UL grant. The DL assignment and/or UL grant may include resources and sequences of a channel to transmit a UL control signal (UCI: Uplink Control Information) of HARQ-ACK feedback to DL data, channel measurement information (CSI: Channel State Information) and the like, and information on transmission formats. Further, DCI for scheduling the UL control signal (UCI: Uplink Control Information) may be defined differently from the DL assignment and UL grant.

The UE is configured to monitor a set of the predetermined number of downlink control channel candidates. Herein, for example, "monitor" refers to attempting to decode each downlink control channel with respect to a target DCI format in the set. Such decoding is also called blind decoding (BD), and blind detection. The downlink control channel candidate is also called a BD candidate, (E)PDCCH candidate and the like.

The set of downlink control channel candidates (a plurality of downlink control channel candidates) to monitor is also called search space. The base station allocates the DCI to predetermined downlink control channel candidates included in the search space. The UE performs blind decoding on one or more candidate resources inside the search space, and detects the DCI for the UE. The search space may be configured by higher layer signaling common to users, or may be configured by user-specific higher layer signaling. Further, two or more search spaces may be configured for the user terminal in the same carrier.

In existing LTE, for the purpose of link adaptation, a plurality of types of aggregation levels (AL: Aggregation Level) is defined for the search space. The AL corresponds to the number of control channel elements (CCE: Control Channel Element)/enhanced control channel elements (ECCE: Enhanced CCE) constituting the DCI. Further, the search space is configured to have a plurality of downlink control channel candidates with respect to some AL. Each downlink control channel candidate is comprised of one or more resource units (CCE and/or ECCE).

The DCI is attached with Cyclic Redundancy Check (CRC) bits. The CRC is subjected to masking (scrambling) with a UE-specific identifier (e.g., Cell-Radio Network Temporary Identifier (C-RNTI)) or system common identifier. The UE is capable of detecting the DCI with CRC scrambled with the C-RNTI that corresponds to the UE, and the DCI with CRC scrambled with the system common identifier.

Further, as the search space, there are common search space configured to be common to UEs, and UE-specific search space configured for each UE. In the UE-specific search space of PDCCH of existing LTE, the AL (=the number of CCEs) is "1", "2, "4" and "8". The number of BD candidates is defined by "6", "6", "2" and "2" with respect to AL=1, 2, 4 and 8, respectively.

In addition, in 5G/NR, it is required to support flexible use of numerology and frequency to actualize dynamic frame configurations. Herein, the numerology refers to a communication parameter (e.g., at least one of subcarrier spacing (SCS: Subcarrier Spacing), bandwidth, symbol length, cyclic prefix (CP) length, transmission time interval (TTI) length, the number of symbols per TTI, radio frame configuration, filtering processing, windowing processing and the like) about the frequency domain and/or the time domain.

For example, in 5G/NR, it is studied to support a plurality of kinds of numerology to apply respective numerology to different services. For example, it is considered that large SCS is used for URLLC to reduce delay, and that small SCS is used for mMTC to reduce power consumption.

Further, in 5G/NR, for example, it is studied to offer services using maximum 100 GHz that is an extremely high carrier frequency. Generally, as the carrier frequency increases, it is more difficult to secure coverage. The reason is caused by that distance attenuation is severe to strengthen straightness of radio wave, and that the transmit power density is lowered due to ultra-wide band transmission.

Further, in 5G/NR, instead of always performing communication using the entire system band in a predetermined carrier, it is considered that communication is controlled by configuring a predetermined frequency region (also called a frequency band) dynamically or semi-statically based on a use of communication and/or communication environment, etc.

Figure 1A:
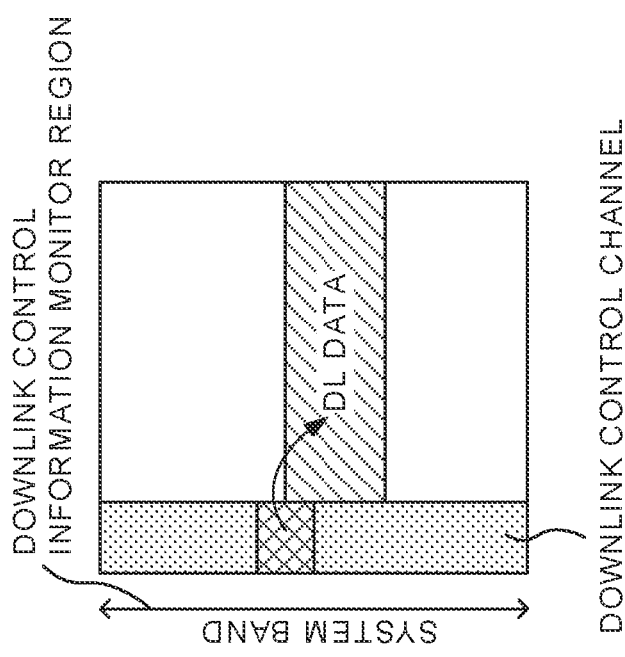

In the existing LTE system, the downlink control channel (or, downlink control information) is transmitted using the entire system bandwidth (see FIG. 1A). Therefore, in each subframe, irrespective of the presence or absence of allocation of DL data, the UE needs to monitor the entire system bandwidth to perform reception (blind decoding) of the downlink control information.

In contrast thereto, in 5G/NR, instead of always allocating downlink control information for some UE to the entire system band to transmit, it is considered that a predetermined frequency region is configured to control transmission of the downlink control information (see FIG. 1B). The predetermined frequency region configured for the UE is also called a control subband.

The control subband is comprised of predetermined resource units, and is capable of being configured to be the system bandwidth (carrier bandwidth) or less. For example, the control subband is capable of being comprised of one or a plurality of RBs (PRB and/or VRB) in the frequency domain. Herein, the RB means a frequency resource block unit comprised of 12 subcarriers. The UE monitors the downlink control information within a range of the control subband, and is capable of controlling reception. By this means, the UE does not need to always monitor the entire system bandwidth, in reception processing of the downlink control information, and is thereby capable of reducing power consumption.

On the other hand, also in the case where the UE monitors the downlink control information within a range of the control subband to control reception, the inventors of the present invention noted the respect that downlink data and/or uplink data scheduled by the downlink control information is desirably received in a wide bandwidth to some extent (e.g., bandwidth wider than the control subband). Therefore, the inventors of the invention conceived configuring a frequency bandwidth used in allocation of downlink control information (or, downlink control information), and a frequency bandwidth used in transmission and/or reception data to control communication.

In one Aspect of the present invention, based on downlink control information allocated to inside a first frequency bandwidth (First RF BW), a UE controls reception of downlink control information and/or downlink data allocated to inside a second frequency bandwidth (Second RF BW) having a bandwidth of the first frequency bandwidth or more. Using the downlink control information allocated to the first frequency band, the radio base station is capable of instructing the UE to monitor a downlink control channel in the second frequency band. In addition, in performing reception processing of signals transmitted in the first frequency bandwidth and second frequency bandwidth, the user terminal may be capable of configuring an RF bandwidth, FFT bandwidth and the like in accordance therewith. In this case, as compared with the case of only configuring a bandwidth to map a baseband signal, it is possible to reduce power consumption of the user terminal.

In another Aspect of the present invention, using the downlink control information allocated to the first frequency bandwidth, the radio base station controls scheduling of downlink data and/or uplink data in the second frequency bandwidth having a bandwidth of the first frequency bandwidth or more.

Embodiments according to the present invention will be described below in detail with reference to drawings. A radio communication method according to each Embodiment may be applied alone, or may be applied in combination.

First Aspect

The first Aspect describes one example of configuring a plurality of frequency bandwidths (RF BW) for a user terminal (UE) to monitor, and based on downlink control information (or, downlink control channel (NR-PDCCH)) transmitted inside some frequency bandwidth, performing reception processing and/or transmission processing of data inside another frequency bandwidth.

In the following description, as a plurality of frequency bandwidths, the first frequency bandwidth (First RF BW) and second frequency bandwidth (Second RF BW) will be described as an example. The first frequency bandwidth and/or second frequency bandwidth may be called the control subband. Further, the first frequency bandwidth and/or the second frequency bandwidth may be configured independently of the control subband. Furthermore, the bandwidth of the first frequency band is capable of being made the bandwidth (or, less than the bandwidth) of the second frequency band or less. Still furthermore, the control subband is capable of being made the first frequency bandwidth and/or the second frequency bandwidth or less (or, less than the bandwidth). In addition, the number of frequency bandwidths used in communication is not limited to "2".

Figure 2:
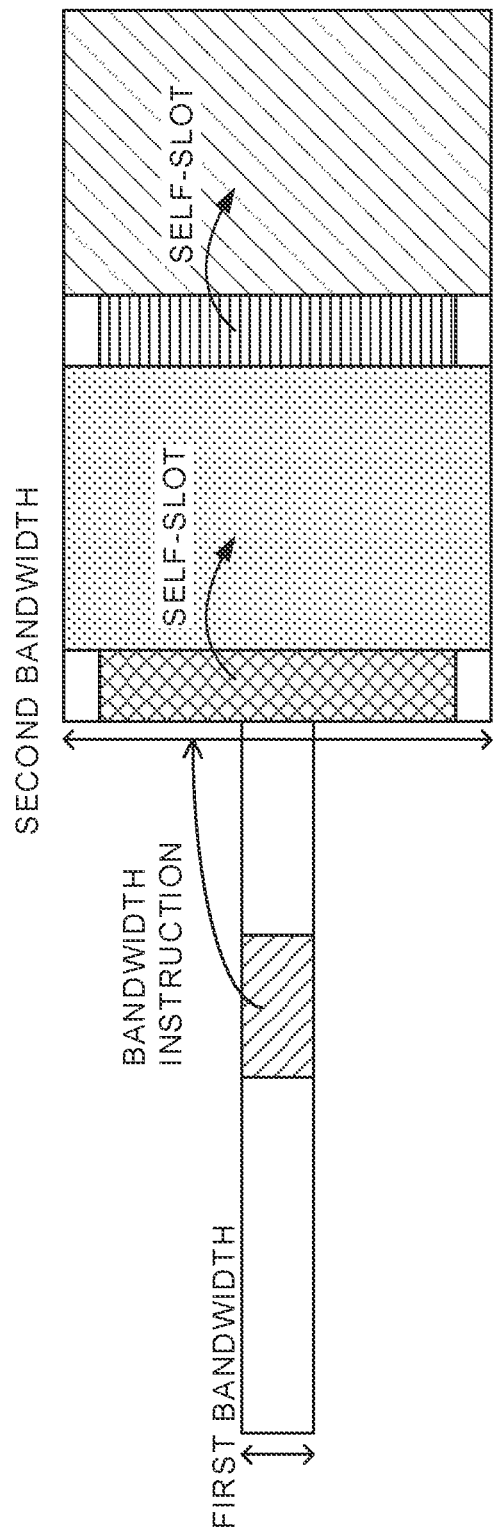
FIG. 2 is a diagram showing one example of a communication method using a plurality of frequency bandwidths.

FIG. 2 shows one example of the case of performing communication using the first frequency bandwidth and second frequency bandwidth. It is possible to perform communication using the first frequency bandwidth and/or the second frequency bandwidth in a unit of predetermined time interval (e.g., subframe, slot, mini-slot (subslot), etc.)

Based on the downlink control information included inside the first frequency bandwidth, the UE controls reception processing and/or transmission processing of a signal included inside the second frequency bandwidth. In other words, the UE performs reception and/or transmission of data, based on the downlink control information transmitted in the first frequency band and the downlink control information transmitted in the second frequency band (2-step scheduling). Using the downlink control information allocated to the first frequency band, the radio base station is capable of instructing the UE to monitor a downlink control signal in the second frequency band.

The radio base station configures monitor operation of downlink control channel (NR-PDCCH) in the first frequency bandwidth for the user terminal. For example, the radio base station notifies the UE of information on the first frequency bandwidth. At this point, the radio base station notifies the UE of the information on the first frequency bandwidth, using at least one of higher layer signaling (RRC signaling, broadcast signal, etc.), MAC control information (MAC CE), and downlink control information.

The information on the first frequency bandwidth corresponds to a place where the first frequency bandwidth is configured and/or bandwidth (e.g., frequency band, center frequency, RB number or the like).

Alternatively, the first frequency bandwidth may be beforehand defined by specifications. The first frequency bandwidth may be configured based on each frequency band to use, frequency bandwidth to transmit a synchronization signal and broadcast channel, frequency position and/or numerology or the like.

Further, the radio base station may notify (configure) the UE of a parameter of a downlink control channel in the second frequency bandwidth. It is possible to configure the second frequency bandwidth to be a bandwidth wider than the first frequency bandwidth. A plurality of frequency bandwidths is prepared as the second frequency bandwidth (or, region to allocate the downlink control information inside the second frequency bandwidth), and based on predetermined conditions of a traffic amount, channel quality and the like, a predetermined frequency bandwidth may be used to control communication. As the plurality of frequency bandwidths, it is possible to configure a small bandwidth, middle bandwidth, large (wide) bandwidth and the like. Further, the downlink control channel allocated to the second frequency bandwidth may be configured also in a range of the system bandwidth or less.

The number of symbols (symbols to map the downlink control channel) used in transmission of the downlink control channel is capable of being configured for each of the first frequency band and second frequency band independently. As one example, a plurality of symbols (e.g., 2 symbols) is used for the downlink control channel in the first frequency band, and one symbol is used for the downlink control channel in the second frequency band.

By performing transmission of the downlink control channel using the higher number of symbols in the first frequency band with the bandwidth smaller than in the second frequency band, also in the case of narrowing the first frequency bandwidth, it is possible to secure resources for the downlink control channel, and to improve usage efficiency of resources in the second frequency bandwidth. In addition, the number of symbols used in the downlink control channel may be configured to be the same in the first frequency band and second frequency band.

In the case of receiving the downlink control information for instructing the UE to monitor the downlink control channel allocated to the second frequency band in the first frequency band, the UE starts to monitor the downlink control channel in the second frequency band after a lapse of a predetermined period. The timing for starting to monitor in the second frequency band may be the next time interval after a time interval (e.g., subframe, slot, mini-slot (subslot), etc.) in which the downlink control information is received in the first frequency band, or may be a time interval after a lapse of a predetermined period.

The UE, which is instructed to monitor in the second frequency band, controls to monitor the downlink control channel only a predetermined number of times (e.g., once, or 1 time interval). In the case where the UE performs monitoring over a plurality of time intervals where the downlink control channel is multiplexed, the monitor period may be controlled with a timer. For example, the UE starts the timer in the case of receiving, in the first frequency band, the downlink control information for indicating monitoring in the second frequency band, and performs monitoring of the downlink control information in the second frequency band until the timer expires. After the expiration of the timer, the UE performs monitoring again inside the first frequency bandwidth.

Thus, based on the downlink control information included in the first frequency band, by controlling monitoring in the second frequency band, it is possible to configure a narrow frequency band to monitor for a period during which data is not allocated to the UE. By this means, it is possible to decrease the load of reception operation on the user terminal and reduce power consumption.

As described above, using the downlink control information transmitted inside the first frequency bandwidth, the radio base station notifies the UE of usage of the second frequency band. Further, the station may include information (parameter) on the second frequency band in the downlink control information to notify the user terminal. The information on the second frequency band corresponds to a place where the second frequency band is configured and/or bandwidth (e.g., frequency band, center frequency, RB number or the like).

Further, the downlink control information for indicating usage of the second frequency band may be transmitted in a new DCI format different from the DCI format specified in the existing LTE system. It is preferable that the size of the new DCI format is the same as the size of the DCI format used in scheduling of downlink and/or uplink (DL/UL). By this means, also in the case of introducing the new DCI format, it is possible to suppress increases in the number of blind decoding times. Further, the DCI format may be a sequence with CRC subjected to masking (scrambling) with the user terminal common identifier, or may be a sequence with CRC subjected to masking (scrambling) with the user terminal-specific C-RNTI.

The downlink control information for indicating usage (monitoring) of the second frequency band is attached with CRC (Cyclic Redundancy Check), and the CRC may undergo masking using the dedicated RNTI. By this means, it is possible to distinguish between the DCI format that corresponds to the downlink control information for indicating usage of the second frequency band and the DCI format used in scheduling of DL/UL.

Figure 3:
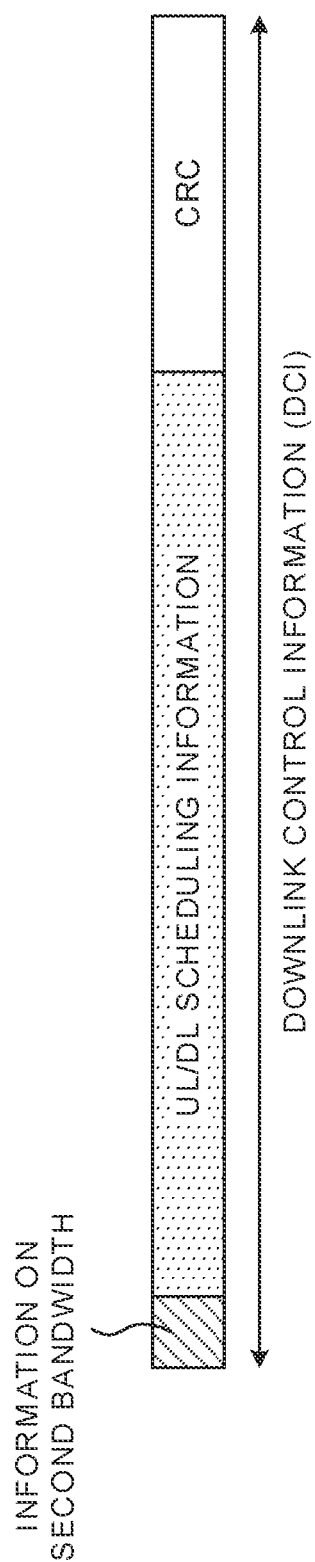
FIG. 3 is a diagram showing one example of a DCI format in Aspect 1.

Alternatively, the downlink control information for indicating usage of the second frequency band may be configured to be included in the DCI format (e.g., DCI format of existing LTE) used in scheduling of DL/UL (see FIG. 3). FIG. 3 illustrates a DCI format including a bit field (e.g., 1 bit or a plurality of bits) to indicate monitoring of the second frequency band, a bit field to use in scheduling of DL/UL, and CRC. In this case, scheduling of DL/UL may be scheduling in the first frequency band, or may be scheduling in another frequency band.

Second Aspect

The second Aspect describes the case where the downlink control information transmitted in the first frequency bandwidth performs scheduling of DL data (or, downlink shared channel) in another frequency bandwidth (e.g., second frequency bandwidth). Thus, scheduling of data in a different time interval may be called cross-slot scheduling, cross-subframe scheduling and the like. In addition, in the following description, the case of performing scheduling of DL data will be described as an example, and the invention is similarly applicable to the case of performing scheduling of UL data (or, uplink shared channel) using the downlink control information. For example, in the following description, it is possible to control uplink data transmission with the DL data replaced with the UL data.

Figure 4:
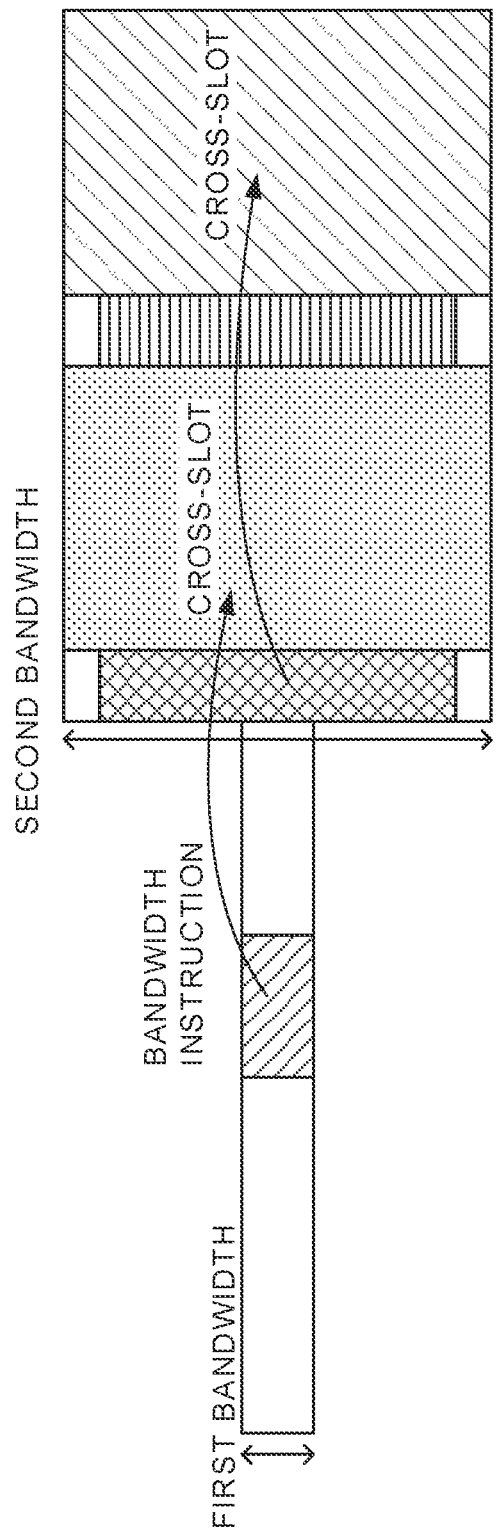
FIG. 4 is a diagram showing another example of the communication method using a plurality of frequency bandwidths.

FIG. 4 shows one example of the case of performing communication using the first frequency bandwidth and second frequency bandwidth. Based on the downlink control information included in the first frequency bandwidth, the UE controls reception processing of DL data in the second frequency bandwidth. Using the downlink control information allocated to the first frequency bandwidth, the radio base station is capable of controlling scheduling of DL data in the second frequency band.

The radio base station configures monitoring operation of the downlink control information in the first frequency bandwidth for the UE. Further, the radio base station may notify (configure) the UE of a parameter of the downlink control information in the second frequency bandwidth. These matters are capable of being controlled as in the above-mentioned first Aspect.

In the case of receiving the downlink control information for scheduling data allocated to the second frequency band in the first frequency band, the UE controls reception of downlink data in the second frequency configured after a lapse of a predetermined period. The reception timing of the downlink data in the second frequency band may be the next time interval after a time interval (e.g., subframe, slot, mini-slot (subslot), etc.) in which the downlink control information is received in the first frequency band, or may be a time interval after a lapse of a predetermined period.

As shown in FIG. 4, based on the downlink control information transmitted inside the first frequency bandwidth, the radio base station is capable of scheduling (cross-slot scheduling) downlink data in another frequency bandwidth (that is not the subset of the first frequency bandwidth) different from the first frequency bandwidth. In this case, the UE monitors the downlink control channel at timing immediately before and/or timing immediately after the downlink data scheduled in the second frequency band.

FIG. 4 illustrates the case where the UE monitors the downlink control information allocated to inside the second frequency bandwidth at timing immediately before the downlink data scheduled in the second frequency band. The downlink control information transmitted at timing immediately before the downlink data in the second frequency band is capable of scheduling downlink data in the next time segment (cross-slot scheduling)

The UE, where the downlink data in the second frequency region is scheduled by the downlink control information transmitted in the first frequency band, is capable of controlling to perform monitoring of the downlink control information in the second frequency band only a predetermined number of times (e.g., once). In the case of performing monitoring over a plurality of time intervals where the downlink control channel is multiplexed, the UE may control the monitoring period with a timer. For example, the UE starts the timer in the case of receiving the downlink control information in the first frequency band, and performs monitoring of the downlink control information included in the second frequency band until the timer expires.

Thus, based on the downlink control information included in the first frequency band, by controlling reception of data and/or monitoring of the downlink control channel in the second frequency band, it is possible to configure a narrow frequency band to monitor for a period during which data is not allocated to the UE. By this means, it is possible to decrease the load of reception operation on the UE and reduce power consumption.

In addition, the time taken for switching between the first frequency region and the second frequency band may vary corresponding to the capability of the user terminal. In this case, the user terminal beforehand notifies of terminal capability information on the time taken for switching between the first frequency band and the second frequency band of the terminal, and the base station is thereby capable of properly controlling switching between the frequency bands.

Third Aspect

The third Aspects describes the method of properly controlling communication even in the case where a UE misses detection of downlink control information transmitted in the first frequency bandwidth and/or the second frequency bandwidth.

A possibility is also considered that a UE misses detection of downlink control information for indicating usage (monitoring) of another frequency band (First Aspect) or downlink control information for performing cross-slot scheduling (Second Aspect), in the first frequency band. In the case where the UE misses detection of the downlink control information, the UE is not able to determine when the UE switches the frequency bandwidth (e.g., the first frequency bandwidth and the second frequency bandwidth) used in communication.

Therefore, even in the case where a UE misses detection of downlink control information transmitted in the first frequency band and/or the second frequency band, in order to properly perform communication, it is possible to apply one of the following Aspects 1 to 4. The following Aspects 1 to 4 may be applied along, or at least a part thereof may be combined to apply.

Aspect 1

In Aspect 1, the UE receives downlink control information in the first frequency band, and also in the case of (after) starting reception processing of a downlink control channel (downlink control information) in the second frequency band a predetermined time later, continues the reception processing of the downlink control channel in first frequency band. In other words, also in the case of performing the reception processing in the second frequency band, the UE continuously performs monitoring (blind decoding) of downlink control channel candidates in the first frequency band. The downlink control information transmitted in the first frequency band corresponds to downlink control information for indicating monitoring of the second frequency band and/or downlink control information for scheduling data in the second frequency band.

The number of blind decoding times on downlink control channel candidates configured in the first frequency band is capable of being set to be the same or fewer as/than before communication using the second frequency band is indicated. As compared with the case of monitoring only the first frequency band, by decreasing the number of blind decoding times, it is possible to decrease the load of the reception processing on the user terminal.

Aspect 2

In Aspect 2, in the case where the downlink control channel is not detected in the second frequency band for a predetermined period, the UE controls (fall backs) to monitor downlink control channel candidates configured in the first frequency band. The predetermined period may be a fixed value, or may be configured for the UE by higher layer signaling and the like. Further, the predetermined period may be controlled with a timer.

By this means, even in the case where the user terminal does not start reception processing of the downlink control channel in the second frequency, the base station is capable of performing downlink control channel allocation in the first frequency after a predetermined time, and is capable of avoiding disconnection.

Aspect 3

In Aspect 3, a predetermined frequency band (e.g., default frequency band) is configured for a UE. In the case where the UE is not capable of recognizing a frequency band to perform communication, the UE performs reception processing (e.g., blind decoding) of the downlink control channel in the default frequency band. The default frequency region may be the first frequency region, or may be a predetermined second frequency band.

Aspect 4

In Aspect 4, the UE makes feedback on communication instructions using another frequency band (e.g., second frequency band) to the UE or whether or not cross-slot scheduling succeeds.

For example, the UE transmits a receipt confirmation signal (HARQ-ACK) to DL data transmitted in the second frequency band as feedback. Based on the HARQ-ACK to the data in the second frequency band, the radio base station is capable of determining whether the UE performs monitoring (or, communication using the second frequency band) of the second frequency band.

In the case where ACK is transmitted from the UE as feedback, the radio base station determines that the UE performs communication using the second frequency band. Further, in the case where NACK is transmitted from the UE as feedback, the radio base station determines that the UE uses the second frequency band but misses reception of data, or misses detection of the downlink control information in the first frequency band.

In the case where the UE does not monitor the second frequency band, and does not transmit HARQ-ACK to DL data transmitted in the second frequency band, the radio base station instructs the UE to communicate using the second frequency band, using the downlink control information configured in the first frequency band, or performs cross-slot scheduling.

(Modification)

This Embodiment illustrates the case (FIGS. 5 and 6) where the first frequency band and the second frequency band are configured so that frequency regions overlap, but the method of configuring the first frequency band and the second frequency band is not limited thereto. The first frequency band and the second frequency band may be configured in different carriers, or may be configured in different subbands inside the same carrier.

Figure 5:
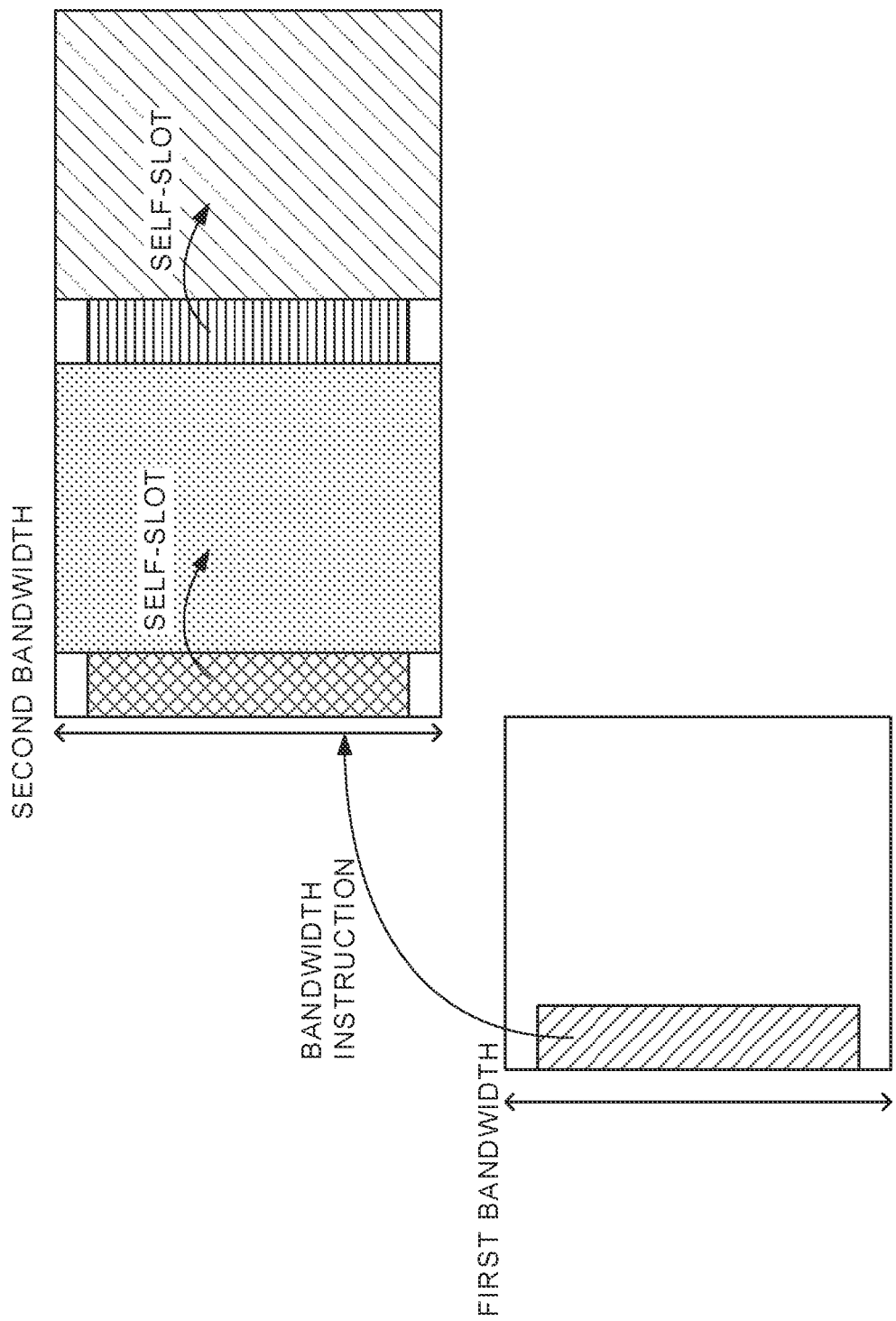
FIG. 5 is a diagram showing still another example of the communication method using a plurality of frequency bandwidths.
Figure 6:
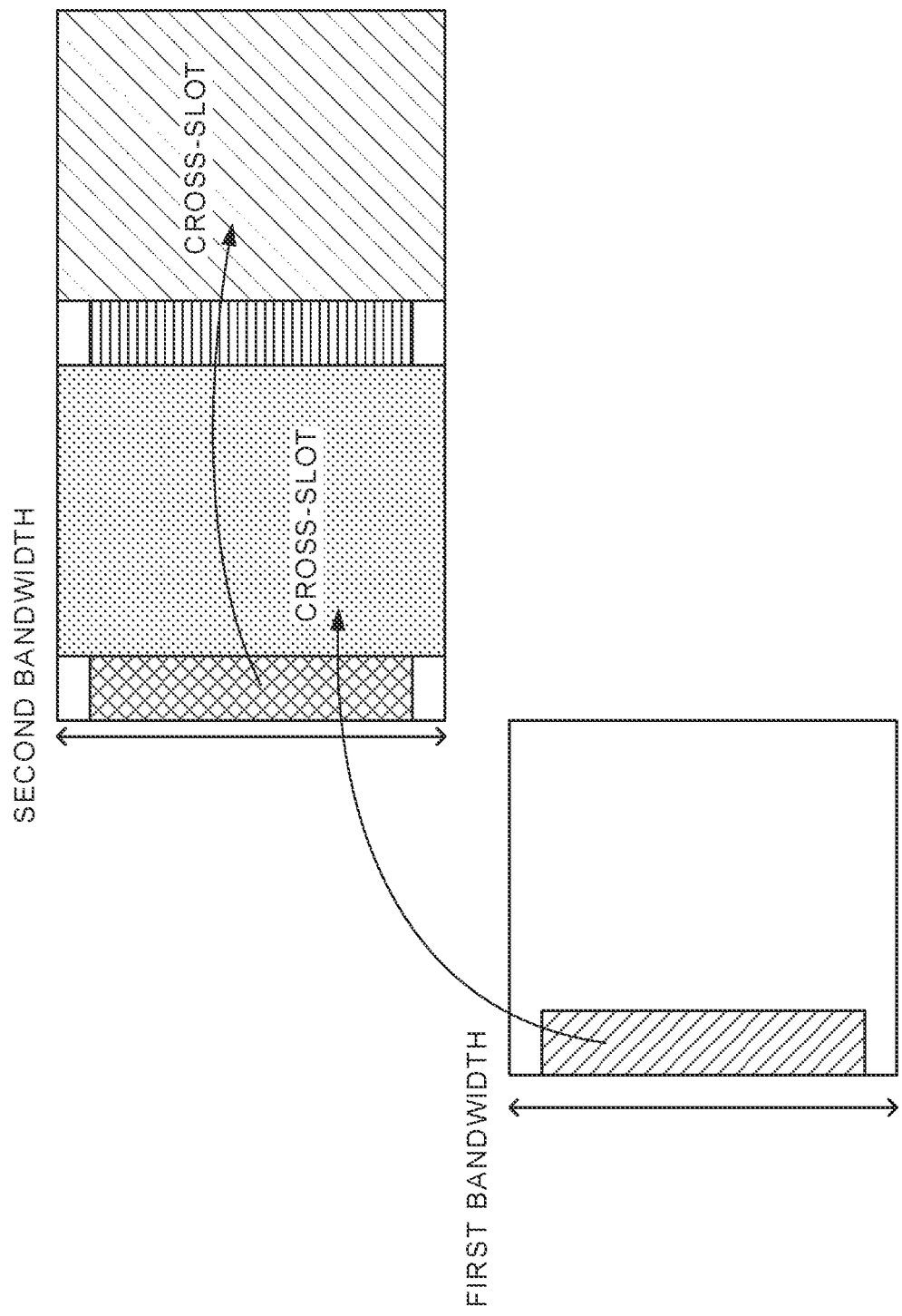
FIG. 6 is a diagram showing still another example of the communication method using a plurality of frequency bandwidths.

FIGS. 5 and 6 illustrate the case of configuring the first frequency band and the second frequency band in different carriers. In addition, FIG. 5 illustrates the Aspect (First Aspect) for indicating monitoring of the second frequency band using the downlink control information transmitted in the first frequency band, and FIG. 6 illustrates the Aspect (Second Aspect) for controlling scheduling of data of the second frequency band using the downlink control information transmitted in the first frequency band.

In this case, each of the first frequency bandwidth and the second frequency bandwidth may be configured independently, or may be the same. Further, based on the frequency band where the first frequency band and the second frequency band are configured, it is possible to configure one of the frequency bandwidths to be larger than the other frequency bandwidth.

Thus, the first frequency band and the second frequency band may be configured in different carriers. Alternatively, by configuring in different subbands inside the same carrier, it is possible to configure the second frequency band in a position that is not limited to the first frequency band, and therefore, it is possible to enhance flexibility of scheduling.

(Radio Communication System)

A configuration of a radio communication system according to one Embodiment of the present invention will be described below. In the radio communication system, communication is performed by using any of the radio communication methods according to above-mentioned each Embodiment of the invention or combination thereof.

Figure 7:
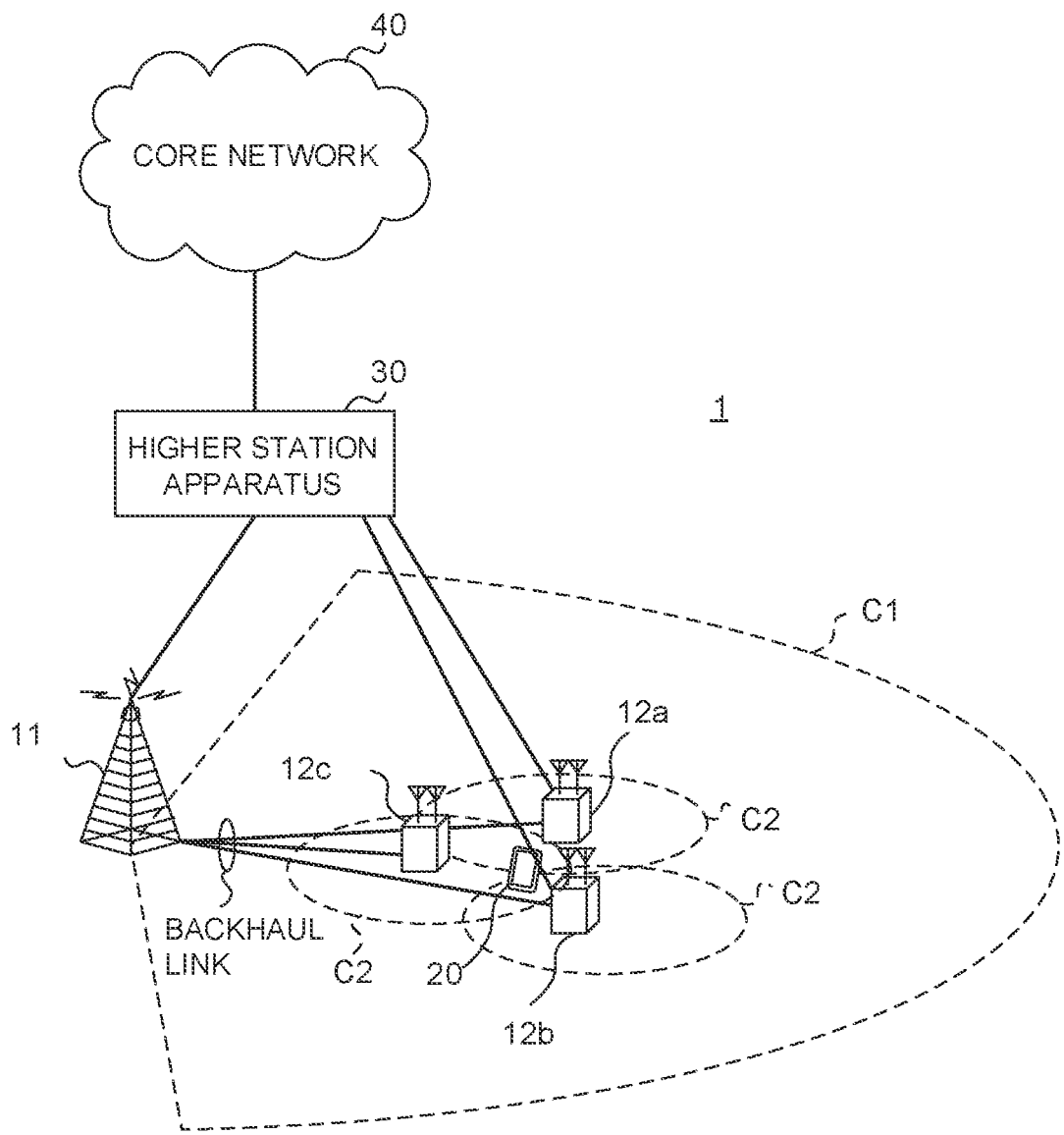
FIG. 7 is a diagram showing one example of a schematic configuration of a radio communication system according to one Embodiment of the present invention.

FIG. 7 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio) and the like, or may be called the system to actualize each system described above.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2. The arrangement of each cell and user terminal 20 is not limited to the arrangement shown in the figure.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g., 5 CCs or less, 6 CCs or more).

The user terminal 20 and radio base station 11 are capable of communicating with each other using carriers (also called the existing carrier, legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface, etc.), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), gNB, transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier Frequency Division Multiple Access (SC-FDMA) is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

In the radio communication system 1, it may be configured that different numerology is applied inside the cell and/or between cells. In addition, for example, the numerology refers to a communication parameter (e.g., subcarrier spacing, bandwidth, etc.) applied to transmission/reception of some signal, As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. Receipt confirmation information (e.g., also referred to as retransmission control information, HARQ-ACK, ACK/NACK, etc.) of HARQ (Hybrid Automatic Repeat reQuest) for the PUSCH is transmitted on the PHICH. The EPDCCH is frequency division multiplexed with the PDSCH (downlink shared data channel) to be used in transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data, higher layer control information and the like is transmitted on the PUSCH. Further, radio quality information (CQI: Channel Quality Indicator) of downlink, receipt confirmation information and the like are transmitted on the PUCCH. A random access preamble to establish connection with the cell is transmitted on the PRACH.

As downlink reference signals, in the radio communication system 1 are transmitted Cell-specific Reference Signal (CRS), Channel State Information-Reference Signal (CSI-RS), Demodulation Reference Signal (DMRS: DeModulation Reference Signal), Positioning Reference Signal (PRS) and the like. Further, as uplink reference signals, in the radio communication system 1 are transmitted Sounding Reference Signal (SRS), Demodulation Reference Signal (DMRS) and the like. In addition, the DMRS may be called UE-specific Reference Signal. Further, the transmitted reference signals are not limited thereto.

(Radio Base Station)

Figure 8:
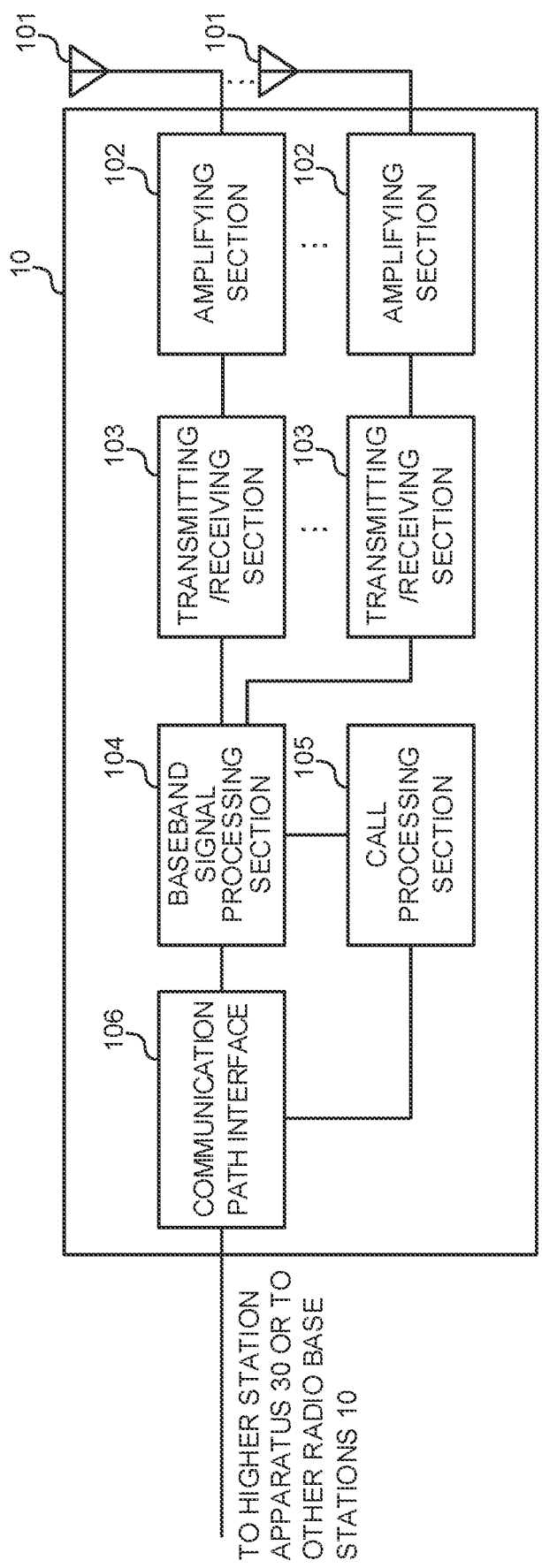
FIG. 8 is a diagram showing one example of an entire configuration of a radio base station according to one Embodiment of the invention.

FIG. 8 is a diagram showing one example of an entire configuration of the radio base station according to one Embodiment of the present invention. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ), scheduling, transmission format selection, channel coding, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101. The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for uplink signals, radio-frequency signals received in the transmitting/receiving antennas 101 are amplified in the amplifying sections 102. The transmitting/receiving section 103 receives the uplink signal amplified in the amplifying section 102. The transmitting/receiving section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing (configuration, release and the like) of a communication channel, state management of the radio base station 10, management of radio resources and the like.

The communication path interface 106 transmits and receives signals to/from the higher station apparatus 30 via a predetermined interface. Further, the communication path interface 106 may transmit and receive signals (backhaul signaling) to/from another radio base station 10 via an inter-base station interface (e.g., optical fiber in conformity with CPRI (Common Public Radio Interface), X2 interface).

The transmitting/receiving section 103 transmits first downlink control information transmitted inside the first frequency bandwidth, and second downlink control information and/or downlink data transmitted inside the second frequency bandwidth having a bandwidth of the first frequency bandwidth or more. Further, the transmitting/receiving section 103 transmits information for instructing the terminal to monitor the second frequency bandwidth, information on the first frequency bandwidth, information on the second frequency bandwidth, and the like.

Moreover, for example, the transmitting/receiving section 103 may transmit, to the user terminal 20, information on search space of predetermined numerology, information on a multi-configuration of signals of a plurality of numerology, information on a multi-configuration of search space of a plurality of numerology, information on numerology supported by the network, and the like.

Figure 9:
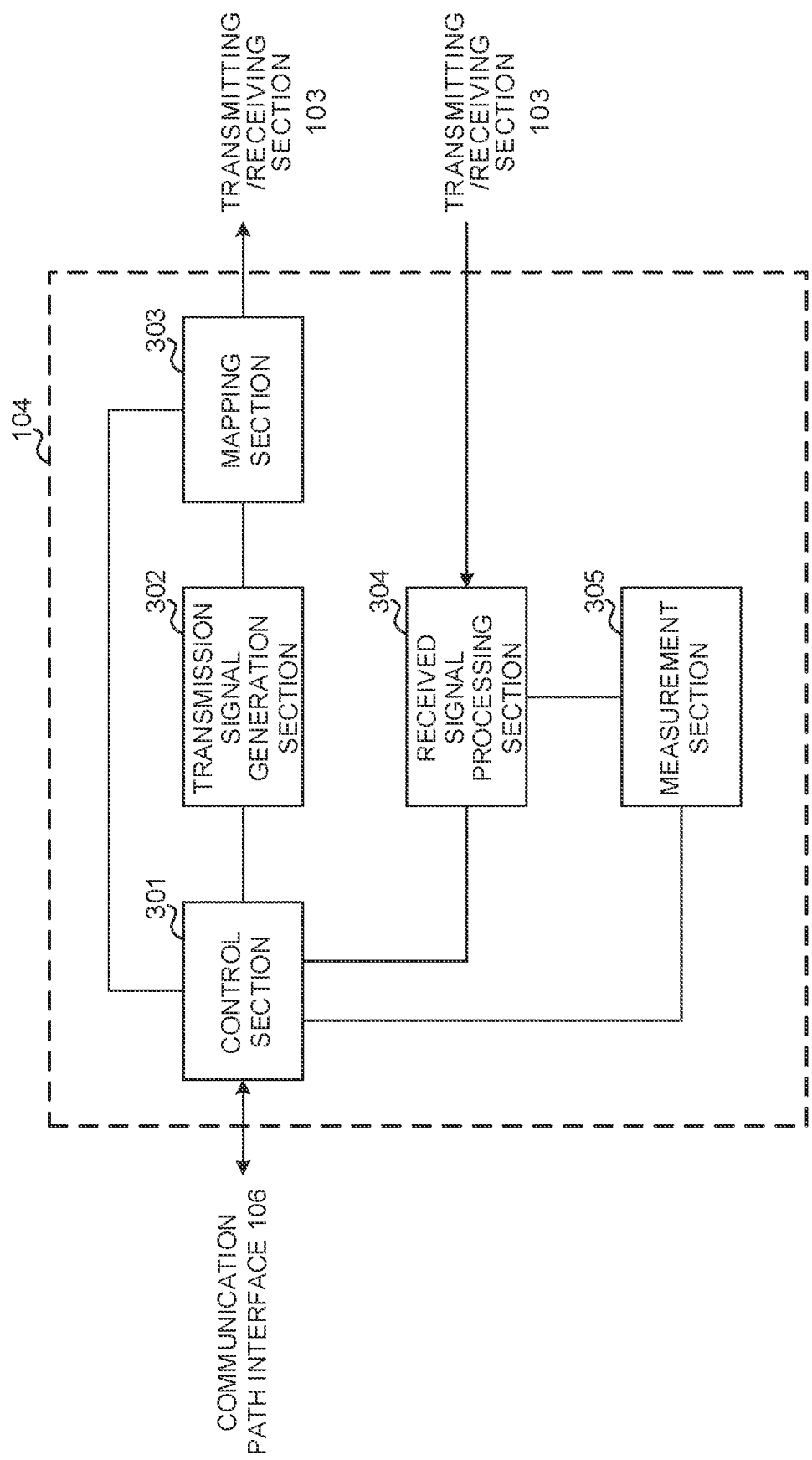
FIG. 9 is a diagram showing one example of a function configuration of the radio base station according to one Embodiment of the invention.

FIG. 9 is a diagram showing one example of a function configuration of the radio base station according to one Embodiment of the present invention. In addition, this example mainly illustrates function blocks of a characteristic portion in this Embodiment, and the radio base station 10 is assumed to have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and a part or the whole of the components may not be included in the baseband signal processing section 104.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals by the transmission signal generating section 302, allocation of signals by the mapping section 303 and the like. Further, the control section 301 controls reception processing of signals by the received signal processing section 304, measurement of signals by the measurement section 305 and the like.

The control section 301 controls scheduling (e.g., resource allocation) of system information, downlink data signal (e.g., signal transmitted on the PDSCH), and downlink control signal (e.g., signal transmitted on the PDCCH and/or EPDCCH). Further, based on a result obtained by determining the necessity of retransmission control to an uplink data signal, and the like, the control section 301 controls generation of the downlink control signal (e.g., receipt confirmation signal, etc.), downlink data signal and the like. Furthermore, the control section 301 controls scheduling of synchronization signals (e.g., PSS (Primary Synchronization Signal)/SSS (Secondary Synchronization Signal)), downlink reference signals (e.g., CRS, CSI-RS, DMRS) and the like.

Further, the control section 301 controls scheduling of the uplink data signal (e.g., signal transmitted on the PUSCH), uplink control signal (e.g., signal transmitted on the PUCCH and/or PUSCH), random access preamble transmitted on the PRACH, uplink reference signal and the like.

The control section 301 configures a plurality of frequency bandwidths for the user terminal to control communication. For example, the section 301 transmits downlink control information for indicating monitoring of downlink control information in the second frequency bandwidth and/or scheduling of data, inside the first frequency bandwidth with a bandwidth narrower than the second frequency bandwidth (FIG. 2, FIGS. 4 to 6). Further, the section 301 applies a predetermined DCI format to the downlink control information in the first frequency band to control transmission.

Based on instructions from the control section 301, the transmission signal generating section 302 generates downlink signals (downlink control signal, downlink data signal, downlink reference signal, etc.) to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates DL assignment to notify of assignment information of downlink signals and UL grant to notify of assignment information of uplink signals. Further, the downlink data signal is subjected to coding processing and modulation processing, according to a coding rate, modulation scheme and the like determined based on the channel state information (CSI) from each user terminal 20 and the like.

Based on instructions from the control section 301, the mapping section 303 maps the downlink signal generated in the transmission signal generating section 302 to predetermined radio resources to output to the transmitting/receiving section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding, etc.) on the received signal input from the transmitting/receiving section 103. Herein, for example, the received signal is the uplink signal (uplink control signal, uplink data signal, uplink reference signal, etc.) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving the PUCCH including HARQ-ACK, the section 304 outputs the HARQ-ACK to the control section 301. Further, the received signal processing section 304 outputs the received signal and/or signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, the measurement section 305 may measure received power (e.g., RSRP (Reference Signal Received Power)), received quality (e.g., RSRQ (Reference Signal Received Quality), SINR (Signal to Interference plus Noise Ratio)), uplink propagation path information (e.g., CSI) and the like of the received signal. The measurement result may be output to the control section 301.

(User Terminal)

Figure 10:
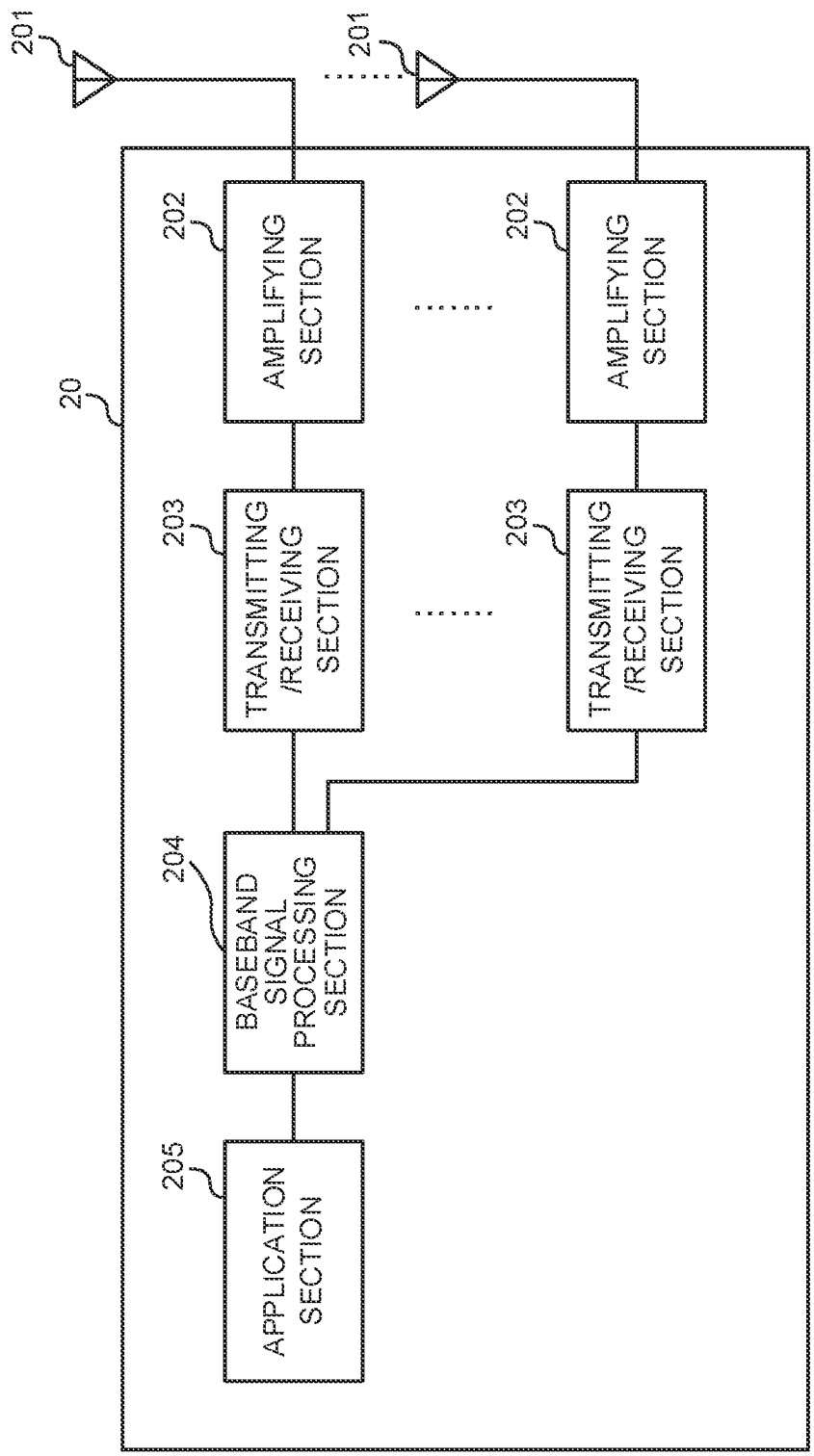
FIG. 10 is a diagram showing one example of an entire configuration of a user terminal according to one Embodiment of the invention.

FIG. 10 is a diagram showing one example of an entire configuration of the user terminal according to one Embodiment of the present invention. The user terminal 20 is provided with a plurality of transmitting/receiving antennas 201, amplifying sections 202, transmitting/receiving sections 203, baseband signal processing section 204, and application section 205. In addition, with respect to each of the transmitting/receiving antenna 201, amplifying section 202, and transmitting/receiving section 203, the user terminal may be configured to include at least one or more.

Radio-frequency signals received in the transmitting/receiving antennas 201 are respectively amplified in the amplifying sections 202. Each of the transmitting/receiving sections 203 receives the downlink signal amplified in the amplifying section 202. The transmitting/receiving section 203 performs frequency conversion on the received signal into a baseband signal to output to the baseband signal processing section 204. The transmitting/receiving section 203 is capable of being comprised of a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information may also be transferred to the application section 205.

On the other hand, for user data on uplink, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmitting/receiving sections 203. Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

The transmitting/receiving section 203 receives the first downlink control information transmitted inside the first frequency bandwidth, and the second downlink control information and/or downlink data transmitted inside the second frequency bandwidth having a bandwidth of the first frequency bandwidth or more. Further, the transmitting/receiving section 203 receives the information for instructing the terminal to monitor the second frequency bandwidth, information on the first frequency bandwidth, information on the second frequency bandwidth, and the like.

Figure 11:
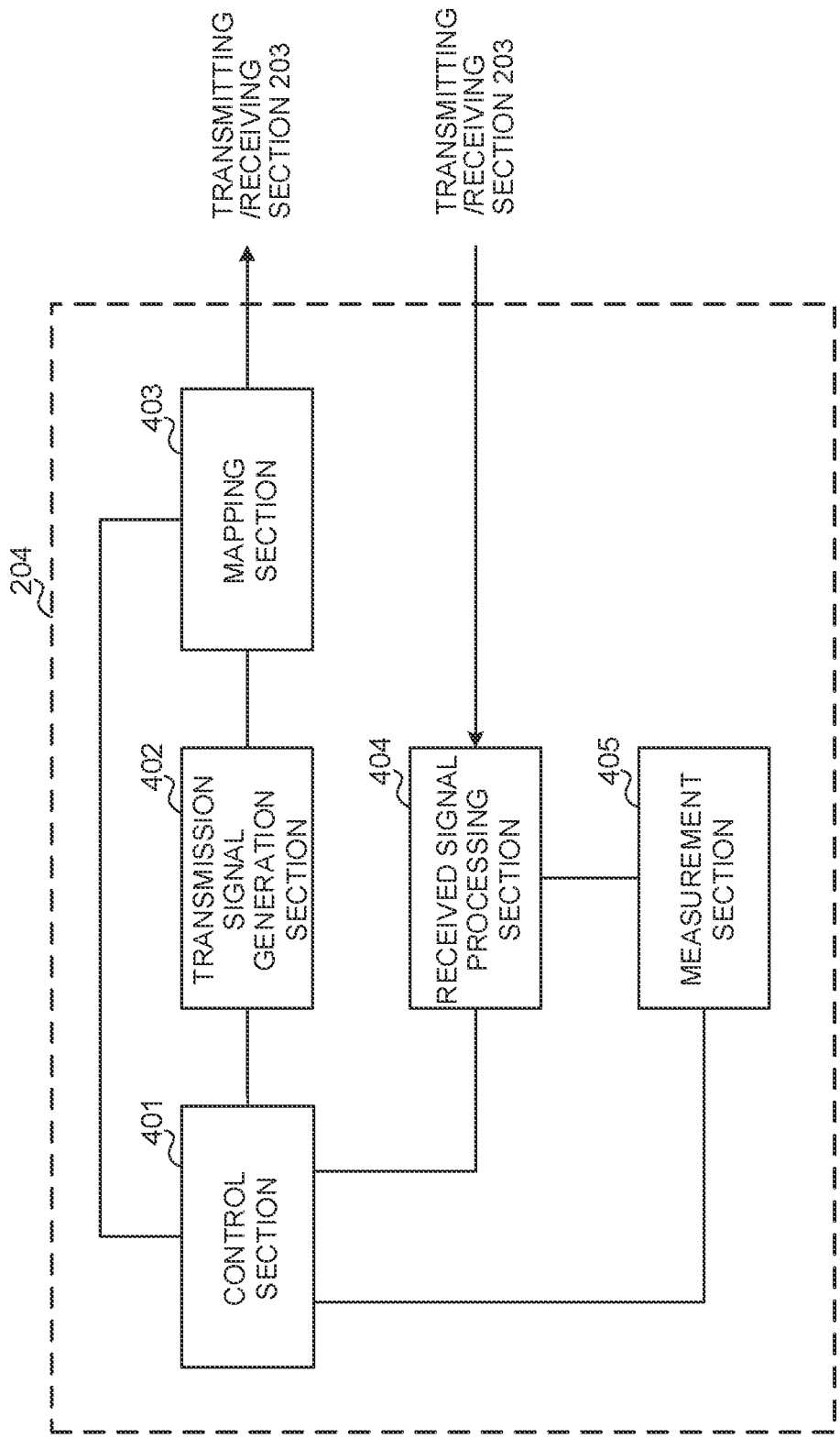
FIG. 11 is a diagram showing one example of a function configuration of the user terminal according to one Embodiment of the invention.

FIG. 11 is a diagram showing one example of a function configuration of the user terminal according to one Embodiment of the present invention. In addition, this example mainly illustrates function blocks of a characteristic portion in this Embodiment, and the user terminal 20 is assumed to have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402, allocation of signals by the mapping section 403 and the like. Further, the control section 401 controls reception processing of signals by the received signal processing section 404, measurement of signals by the measurement section 405 and the like.

The control section 401 acquires the downlink control signal (e.g., signal transmitted on the PDCCH/EPDCCH) and downlink data signal (e.g., signal transmitted on the PDSCH) transmitted from the radio base station 10, from the received signal processing section 404. Based on the downlink control signal and/or a result obtained by determining the necessity of retransmission control to the downlink data signal, and the like, the control section 401 controls generation of the uplink control signal (e.g., receipt confirmation information, etc.) and/or uplink data signal.

Based on the first downlink control information transmitted inside the first frequency bandwidth, the control section 401 controls reception of the downlink control information and/or downlink data transmitted inside the second frequency bandwidth. For example, the control section 401 controls monitoring of the first downlink control information allocated to inside the first frequency bandwidth, and further controls monitoring of the second downlink control information allocated to inside the second frequency bandwidth based on the first downlink control information (see FIG. 2). The first downlink control information includes the information for instructing the terminal to monitor the second frequency bandwidth and/or the information on the second frequency bandwidth (see FIG. 3)

Alternatively, based on the first downlink control information, the control section 401 controls reception of the downlink data allocated to inside the second frequency bandwidth (see FIG. 4). Further, also in the case of performing communication using the second frequency bandwidth based on the first downlink control information, the control section 401 may control to monitor the first downlink control information transmitted inside the first frequency bandwidth. Furthermore, in performing reception processing of signals transmitted in the first frequency bandwidth and second frequency bandwidth, the control section 401 may be capable of configuring an RF bandwidth, FFT bandwidth and the like in accordance therewith. In this case, as compared with the case of only configuring a bandwidth to map a baseband signal, it is possible to reduce power consumption of the user terminal.

Based on instructions from the control section 401, the transmission signal generating section 402 generates uplink signals (uplink control signal, uplink data signal, uplink reference signal, etc.) to output to the mapping section 403. The transmission signal generating section 402 is capable of being comprised of a signal generator, signal generating circuit or signal generating apparatus explained based on the common recognition in the technical field according to the present invention.

For example, based on instructions from the control section 401, the transmission signal generating section 402 generates the uplink control signal about receipt confirmation information, channel state information (CSI) and the like. Further, based on instructions from the control section 401, the transmission signal generating section 402 generates the uplink data signal. For example, when the downlink control signal notified from the radio base station 10 includes the UL grant, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmitting/receiving section 203. The mapping section 403 is capable of being comprised of a mapper, mapping circuit or mapping apparatus explained based on the common recognition in the technical field according to the present invention.

The received signal processing section 404 performs reception processing (e.g. demapping, demodulation, decoding, etc.) on the received signal input from the transmitting/receiving section 203. Herein, for example, the received signal is the downlink signal (downlink control signal, downlink data signal, downlink reference signal, etc.) transmitted from the radio base station 10. The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

The received signal processing section 404 outputs the information decoded by the reception processing to the control section 401. For example, the received signal processing section 404 outputs the broadcast information, system information, RRC signaling, DCI and the like to the control section 401. Further, the received signal processing section 404 outputs the received signal and/or signal subjected to the reception processing to the measurement section 405.

The measurement section 405 performs measurement on the received signal. For example, the measurement section 405 performs measurement using the downlink reference signal transmitted from the radio base station 10. The measurement section 405 is capable of being comprised of a measurement device, measurement circuit or measurement apparatus explained based on the common recognition in the technical field according to the present invention.

For example, the measurement section 405 may measure received power (e.g., RSRP), received quality (e.g., RSRQ, received SINR), downlink propagation path information (e.g., CSI) and the like of the received signal. The measurement result may be output to the control section 401.

(Hardware Configuration)

In addition, the block diagrams used in explanation of the above-mentioned Embodiments show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g., by cable and/or radio), and each function block may be actualized by a plurality of these apparatuses.

Figure 12:
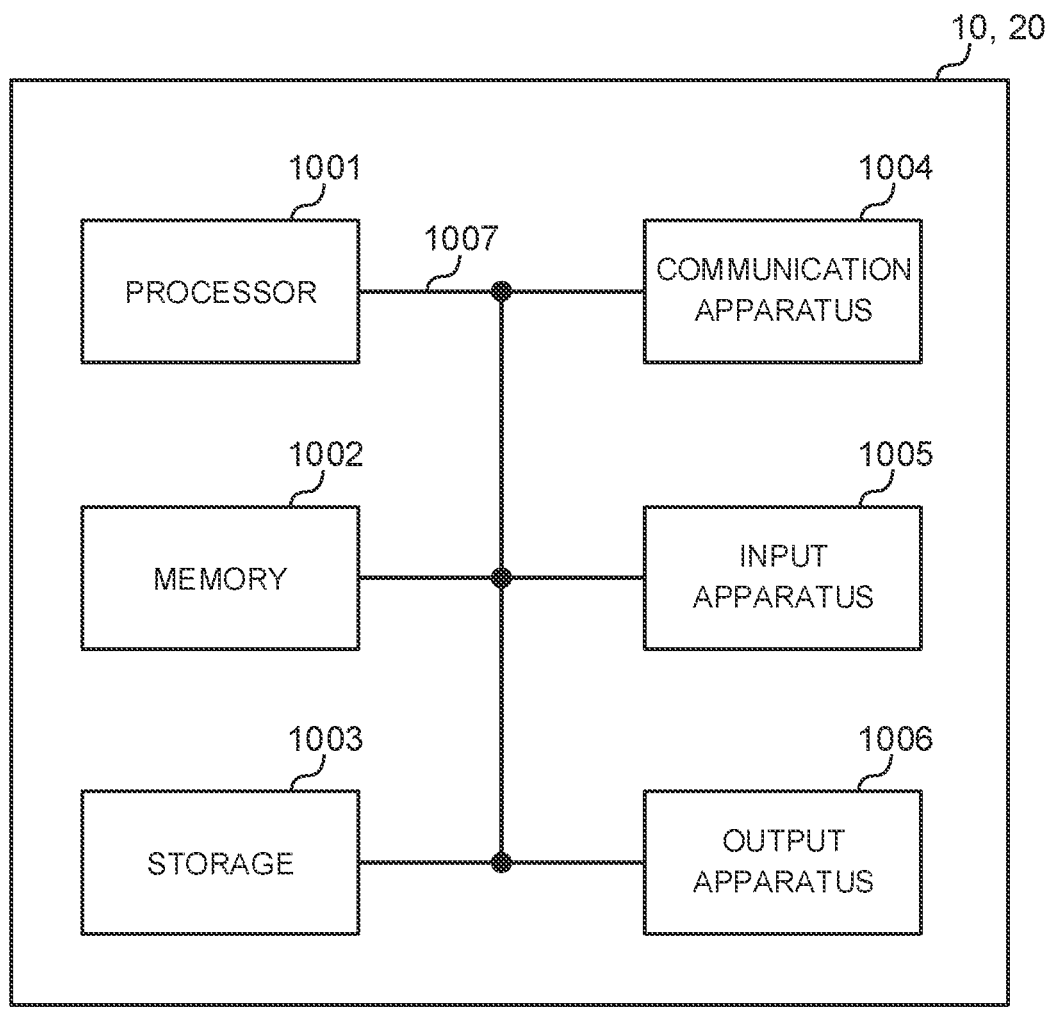
FIG. 12 is a diagram showing one example of hardware configurations of the radio base station and user terminal according to one Embodiment of the invention.

For example, each of the radio base station, user terminal and the like in one Embodiment of the present invention may function as a computer that performs the processing of the radio communication method of the invention. FIG. 12 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiments. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or a part or the whole of each function block may be actualized by the hardware. For example, the processor 1001 may be implemented by at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain The one or each of the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may be a time unit based on numerology. Moreover, the slot may include a plurality of mini-slots. Each mini-slot may be comprised of one or a plurality of symbols in the time domain. Further, the mini-slot may be called a subslot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel.8-12), normal TTI, long TTI, ordinary subframe, normal subframe, long subframe or the like. The TTI shorter than the ordinary TTI may be called shortened TTI, short TTI, partial or fractional TTI, shortened subframe, short subframe, mini-slot, subslot or the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain Further, the RB may include one or a plurality of symbols in the time domain, and may be a length of 1 slot, 1 mini-slot, 1 subframe, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), Resource Element Group (REG), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included inside the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present Description may be expressed using an absolute value, may be expressed using a relative value from a predetermined value, or may be expressed using another corresponding information. For example, the radio resource may be indicated by a predetermined index. Furthermore, equations using these parameters and the like may be different from those explicitly disclosed in the present Description.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiments described in the present Description, and may be performed using another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of predetermined information (e.g., notification of "being X") is not limited to notification that is performed explicitly, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating one or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by an upper node thereof in some case. In a network comprised of one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description do not limit the amount or order of these elements overall. These designations are capable of being used in the present Description as the useful method to distinguish between two or more elements. Accordingly, references of first and second elements do not mean that only two elements are capable of being adopted, or that the first element should be prior to the second element in any manner There is the case where the term of "determining" used in the present Description includes various types of operation. For example, "determining" may be regarded as "determining" calculating, computing, processing, deriving, investigating, looking up (e.g., looking up in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access". In the case of using in the present Description, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the present Description or the scope of the claims, in the case of using "including", "comprising" and modifications thereof, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiments described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

What is claimed is:

1. A terminal comprising:
   a receiver that monitors downlink control channel candidates in a predetermined frequency bandwidth out of a plurality of frequency bandwidths; and
   a processor that performs a control to switch the predetermined frequency bandwidth that is monitored to another frequency bandwidth other than the predetermined frequency bandwidth in accordance with a predetermined timer,
   wherein, if a downlink control information indicating a change in the predetermined frequency bandwidth is received, the processor performs a control to receive a downlink control channel after a period of time.

2. The terminal according to claim 1, wherein, when the predetermined timer expires, the processor sets the predetermined frequency bandwidth to a default frequency bandwidth.

3. The terminal according to claim 1, wherein the downlink control information includes information regarding a change in frequency bandwidth and information regarding downlink scheduling.

4. A radio communication method, comprising:
monitoring downlink control channel candidates in a predetermined frequency bandwidth out of a plurality of frequency bandwidths;
performing a control to switch the predetermined frequency bandwidth that is monitored to another frequency bandwidth other than the predetermined frequency bandwidth in accordance with a predetermined timer; and
in response to a downlink control information indicating a change in the predetermined frequency bandwidth being received, performing a control to receive a downlink control channel after a period of time.

* * * * *